US009134546B2

(12) United States Patent
Pugh et al.

(10) Patent No.: US 9,134,546 B2
(45) Date of Patent: *Sep. 15, 2015

(54) OPHTHALMIC LENS WITH SEGMENTED RING LAYERS IN A FUNCTIONALIZED INSERT

(75) Inventors: Randall B. Pugh, Jacksonville, FL (US); Frederick A. Flitsch, New Windsor, NY (US); Daniel B. Otts, Fruit Cove, FL (US); James Daniel Riall, St. Johns, FL (US); Adam Toner, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 172 days.

This patent is subject to a terminal disclaimer.

(21) Appl. No.: 13/402,263

(22) Filed: Feb. 22, 2012

(65) Prior Publication Data

US 2013/0215378 A1  Aug. 22, 2013

Related U.S. Application Data

(63) Continuation-in-part of application No. 13/401,959, filed on Feb. 22, 2012.

(51) Int. Cl.
*G02C 7/02* (2006.01)
*G02C 7/04* (2006.01)
*G02C 7/08* (2006.01)
*B29D 11/00* (2006.01)
*G02C 7/10* (2006.01)

(52) U.S. Cl.
CPC .......... *G02C 7/083* (2013.01); *B29D 11/00817* (2013.01); *G02C 7/02* (2013.01); *G02C 7/101* (2013.01)

(58) Field of Classification Search
CPC .. G02C 7/083; G02C 7/101; B29D 11/00807; B29D 11/00817; B29D 11/00826
USPC ........................................ 351/159.39, 159.03
See application file for complete search history.

(56) References Cited

U.S. PATENT DOCUMENTS

| 4,601,545 | A | 7/1986 | Kern |
| 6,322,589 | B1 | 11/2001 | Cumming |
| 7,404,636 | B2 | 7/2008 | Blum et al. |
| 7,410,700 | B2 * | 8/2008 | Wang ............................ 428/412 |
| 7,798,301 | B2 | 9/2010 | Keating et al. |

(Continued)

FOREIGN PATENT DOCUMENTS

| EP | 1760515 A2 | 3/2007 |
| WO | WO 2007/050402 A2 | 5/2007 |

(Continued)

OTHER PUBLICATIONS

PCT International Search Report, dated Oct. 2, 2012 for PCT Int'l Appln. No. PCT/US2012/029796.

(Continued)

*Primary Examiner* — Jordan Schwartz

(57) ABSTRACT

This invention discloses various designs for rings and ring segments that make up functionalized layers in a functional layer insert, for incorporation into an ophthalmic lens. The layer insert which can include substrate layers that are intact full rings, segmented rings or a combination of both. Segmented rings may include Arc-Matched and Non Arc-Matched arcuate segments.

23 Claims, 8 Drawing Sheets

(56) References Cited

U.S. PATENT DOCUMENTS

| | | |
|---|---|---|
| 8,343,216 B2 | 1/2013 | Brady et al. |
| 8,579,435 B2 | 11/2013 | Blum et al. |
| 8,950,862 B2 | 2/2015 | Pugh et al. |
| 2004/0131925 A1 | 7/2004 | Jenson et al. |
| 2014/0306361 A1 | 10/2004 | Pugh et al. |
| 2005/0099594 A1 | 5/2005 | Blum et al. |
| 2006/0095128 A1 | 5/2006 | Blum et al. |
| 2006/0265058 A1 | 11/2006 | Silvestrini |
| 2007/0242173 A1 | 10/2007 | Blum et al. |
| 2008/0208335 A1* | 8/2008 | Blum et al. ............. 623/6.22 |
| 2009/0091818 A1 | 4/2009 | Haddock et al. |
| 2009/0204207 A1* | 8/2009 | Blum et al. ............. 623/4.1 |
| 2009/0244477 A1 | 10/2009 | Pugh et al. |
| 2009/0256977 A1 | 10/2009 | Haddock et al. |
| 2010/0001926 A1 | 1/2010 | Amirparviz et al. |
| 2010/0002190 A1 | 1/2010 | Clarke et al. |
| 2010/0072643 A1 | 3/2010 | Pugh et al. |
| 2010/0073534 A1 | 3/2010 | Yano et al. |
| 2010/0076553 A1 | 3/2010 | Pugh et al. |
| 2010/0078838 A1* | 4/2010 | Pugh et al. ............. 264/1.38 |
| 2010/0109175 A1 | 5/2010 | Pugh et al. |
| 2010/0110372 A1 | 5/2010 | Pugh et al. |
| 2011/0045112 A1 | 2/2011 | Pugh et al. |
| 2011/0230963 A1 | 9/2011 | Cuevas |
| 2012/0236254 A1 | 9/2012 | Pugh et al. |
| 2012/0245444 A1 | 9/2012 | Otis et al. |
| 2013/0194540 A1* | 8/2013 | Pugh et al. ............. 351/159.03 |
| 2013/0245754 A1 | 9/2013 | Blum et al. |
| 2013/0245755 A1 | 9/2013 | Fehr et al. |
| 2014/0036226 A1 | 2/2014 | Blum et al. |
| 2014/0148899 A1 | 5/2014 | Fehr et al. |

FOREIGN PATENT DOCUMENTS

| | | |
|---|---|---|
| WO | WO 2010/051225 A1 | 5/2010 |
| WO | WO 2011/163080 A1 | 12/2011 |

OTHER PUBLICATIONS

European Search Report for Application No. EP 13 15 6410 Date of Completion of Report Jun. 5, 2013.

\* cited by examiner

OPHTHALMIC LENS WITH SEGMENTED RING LAYERS IN A FUNCTIONALIZED INSERT

CROSS REFERENCE TO RELATED APPLICATIONS

The present application claims priority as a Continuation in Part application to U.S. patent application Ser. No. 13/401,959 filed Feb. 22, 2012, and entitled, "Methods and Apparatus for Functional Insert with Power Layer" the contents of which are relied upon and incorporated herein by reference.

FIELD OF USE

This invention describes a functionalized layer insert for an ophthalmic device formed from multiple functional layers which are stacked, as well as, in some embodiments, various designs for rings and ring segments that comprise the functional layers.

BACKGROUND

Traditionally an ophthalmic device, such as a contact lens, an intraocular lens or a punctal plug included a biocompatible device with a corrective, cosmetic or therapeutic quality. A contact lens, for example, can provide one or more of: vision correcting functionality; cosmetic enhancement; and therapeutic effects. Each function is provided by a physical characteristic of the lens. A design incorporating a refractive quality into a lens can provide a vision corrective function. A pigment incorporated into the lens can provide a cosmetic enhancement. An active agent incorporated into a lens can provide a therapeutic functionality. Such physical characteristics are accomplished without the lens entering into an energized state. A punctal plug has traditionally been a passive device.

More recently, it has been theorized that active components may be incorporated into a contact lens. Some components can include semiconductor devices. Some examples have shown semiconductor devices embedded in a contact lens placed upon animal eyes. It has also been described how the active components may be energized and activated in numerous manners within the lens structure itself The topology and size of the space defined by the lens structure creates a novel and challenging environment for the definition of various functionalities. Generally, such disclosures have included discrete devices. However, the size and power requirements for available discrete devices are not necessarily conducive for inclusion in a device to be worn on a human eye.

SUMMARY

Accordingly, the present invention includes a functionalized layer insert that can be energized and incorporated into an ophthalmic device. The insert can be formed of multiple layers which may have unique functionality for each layer; or alternatively mixed functionality but in multiple layers. The layers may in some embodiments have layers dedicated to the energization of the product or the activation of the product or for control of functional components within the lens body.

In some embodiments, the functionalized layer insert may contain a layer in an energized state which is capable of powering a component capable of drawing a current. Components may include, for example, one or more of: a variable optic lens element, and a semiconductor device, which may either be located in the stacked layer insert or otherwise connected to it. Some embodiments can also include a cast molded silicone hydrogel contact lens with a rigid or formable insert of stacked functionalized layers contained within the ophthalmic lens in a biocompatible fashion.

Accordingly, the present invention includes a disclosure of an ophthalmic lens layer insert comprising stacked functionalized layer portion designs, as well as various designs for rings and ring segments that comprise the functional layers. In some embodiments, the layer insert can include substrate layers that are intact full rings, segmented rings or a combination of both. Furthermore, segmented rings may include Arc-Matched and Non Arc-Matched arcuate segments.

An insert may be formed from multiple layers in various manners and placed in proximity to one, or both of, a first mold part and a second mold part. A reactive monomer mix is placed between the first mold part and the second mold part. The first mold part is positioned proximate to the second mold part thereby forming a lens cavity with the energized substrate insert and at least some of the reactive monomer mix in the lens cavity; the reactive monomer mix is exposed to actinic radiation to form an ophthalmic lens. Lenses may be formed via the control of actinic radiation to which the reactive monomer mixture is exposed.

DETAILED DESCRIPTION OF THE INVENTION

Figure 1:
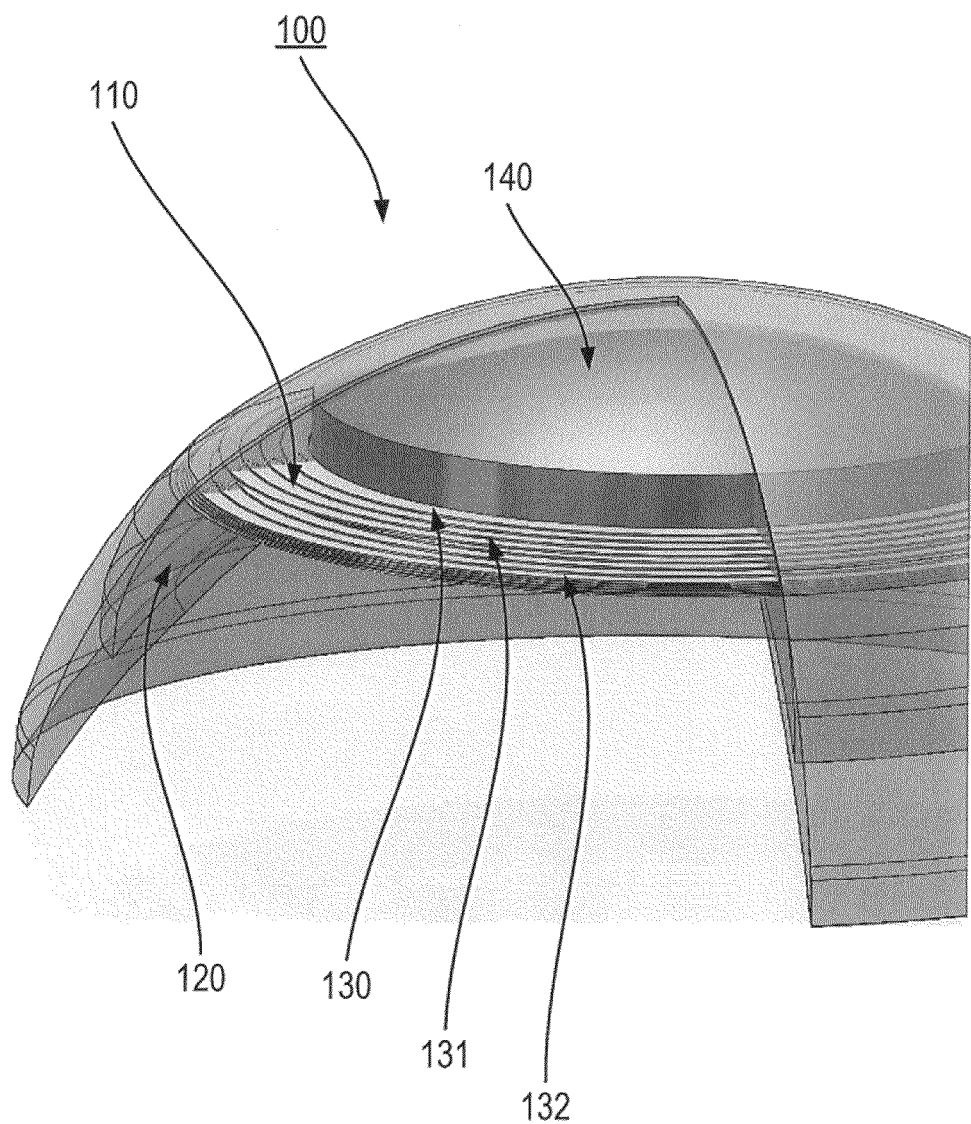
FIG. 1 illustrates a three dimensional representation of an insert formed of stacked functional layers which is incorporated within an ophthalmic lens mold part.

The present invention includes a substrate insert device formed through the stacking of multiple functionalized layers. Additionally the present invention includes various designs for a wafer including rings and ring segments that may be used to make up functionalized layers in a functional layer insert, for incorporation into an ophthalmic lens.

In the following sections detailed descriptions of embodiments of the invention will be given. The description of both preferred and alternative embodiments are exemplary embodiments only, and it is understood that to those skilled in the art that variations, modifications and alterations may be apparent. It is therefore to be understood that said exemplary embodiments do not limit the scope of the underlying invention.

Glossary

In this description and claims directed to the presented invention, various terms may be used for which the following definitions will apply:

Active Lens Insert: as used herein refers to an electronic or electromechanical device with controls based upon logic circuits.

Arc-matched (or arc matching): as used herein refers to the design of a Ring Segment which includes an identical External Radius and Internal Radius, such that the curvature of the External Arc matches the curvature of the Internal Arc. Arc matching is used to efficiently nest Ring Segments on a Wafer, maximizing wafer utilization.

Dicing Street Width: as used herein refers to the width of a thin non-functional space between integrated circuits on a Wafer, where a saw or other device or method can safely cut the Wafer into individual Die without damaging the circuits.

Die: as used herein refers to a block of semiconducting material, on which a given functional circuit is fabricated. Die are created on and cut from a Wafer.

Energized: as used herein refers to the state of being able to supply electrical current to or to have electrical energy stored within.

Energy: as used herein refers to the capacity of a physical system to do work. Many uses within this invention may relate to the said capacity being able to perform electrical actions in doing work.

Energy Source: as used herein refers to device capable of supplying Energy or placing a biomedical device in an Energized state.

External Arc: as used herein refers to the external or convex edge of a Ring Segment, which is a portion of the circumference of the circle defined by the External Radius.

External Radius: as used herein refers to the radius of the circle that defines the external edge of a Full Ring or Ring Segment. The External Radius determines the curvature of the External Arc.

Full Ring: as used herein refers to one complete ring-shaped layer in a Functionalized Layer Insert. A Full Ring may be comprised of multiple Ring Segments or may be one Intact Ring.

Functionalized: as used herein refers to making a layer or device able to perform a function including for example, energization, activation, or control.

Functionalized Layer Insert: as used herein refers to an insert for an ophthalmic device formed from multiple functional layers which are stacked. The multiple layers may have unique functionality for each layer; or alternatively mixed functionality but in multiple layers. In some preferred embodiments, the layers can be assembled into rings.

Intact Ring: as used herein refers to one complete ring-shaped layer in a Functionalized Layer Insert which is made of a single intact Die.

Internal Arc: as used herein refers to the internal or concave edge of a Ring Segment. The Internal Arc may, in some embodiments, be a single arc segment, the curvature of which is determined by the Internal Radius. In other embodiments the Internal Arc may be comprised of multiple arc segments of different curvatures, defined by different Internal Radii.

Internal Radius: as used herein refers to the radius of the circle that defines the internal edge or a portion of the internal edge of a Full Ring or Ring Segment. The Internal Radius determines the curvature of the Internal Arc.

Lens: refers to any ophthalmic device that resides in or on the eye. These devices can provide optical correction or may be cosmetic. For example, the term lens can refer to a contact lens, intraocular lens, overlay lens, ocular insert, optical insert or other similar device through which vision is corrected or modified, or through which eye physiology is cosmetically enhanced (e.g. iris color) without impeding vision. In some embodiments, the preferred lenses of the invention are soft contact lenses are made from silicone elastomers or hydrogels, which include but are not limited to silicone hydrogels, and fluorohydrogels.

Mold: refers to a rigid or semi-rigid object that may be used to form lenses from uncured formulations. Some preferred molds include two mold parts forming a front curve mold part and a back curve mold part.

Power: as used herein refers to work done or energy transferred per unit of time.

Ring Segment: as used herein refers to one Die which may be combined with other Die to construct a Full Ring. As used in this invention, a Ring Segment is generally flat and is formed in an arcuate shape.

Stacked: as used herein means to place at least two component layers in proximity to each other such that at least a portion of one surface of one of the layers contacts a first surface of a second layer. In some embodiments, a film, whether for adhesion or other functions may reside between the two layers that are in contact with each other through said film.

Substrate insert: as used herein refers to a formable or rigid substrate capable of supporting an Energy Source within an ophthalmic lens. In some embodiments, the Substrate insert also supports one or more components.

Wafer: as used herein refers to a thin slice of semiconductor material, such as silicon crystal, used in the fabrication of integrated circuits and other microdevices. The wafer serves as the substrate for microelectronic devices built in and over the wafer and undergoes many microfabrication process steps.

Apparatus

Referring now to FIG. 1, demonstrated as item 100 is a three dimensional representation of some embodiments of a fully formed ophthalmic lens using a stacked layer substrate insert formed as a functionalized layer insert 110. The representation shows a partial cut out from the ophthalmic lens to realize the different layers present inside the device. A body material 120 is shown in cross section of the encapsulating layers of the substrate insert. The body material 120 is contained fully within and extends around the entire circumference of the ophthalmic lens. It may be clear to one skilled in the arts that the actual functionalize layer insert 110 may comprise a full annular ring or other shapes that still may reside within the constraints of the size of a typical ophthalmic lens.

Layers 130, 131 and 132 illustrate three of numerous layers that may be found in a functionalized layer insert 110. In some embodiments, a single layer may include one or more of: active and passive components and portions with structural, electrical or physical properties conducive to a particular purpose.

In some embodiments, a layer 130 may include an energization source, such as, for example, one or more of: a battery, a capacitor and a receiver within the layer 130. Item 131 then, in a non limiting exemplary sense, may comprise microcircuitry in a layer that detects actuation signals for an active lens insert 140. In some embodiments, a power regulation layer 132, may be included that is capable of receiving power from external sources, charging the battery layer 130 and controlling the use of battery power from layer 130 when the lens is not in a charging environment. The power regulation layer 132 may also control signals to an exemplary active lens insert 140 in the center annular cutout of the functionalized layer insert 110.

In general, according to this embodiment, a functionalized layer insert 110 is embodied within an ophthalmic lens via automation which places an energy source a desired location relative to a mold part used to fashion the lens.

Figure 2:
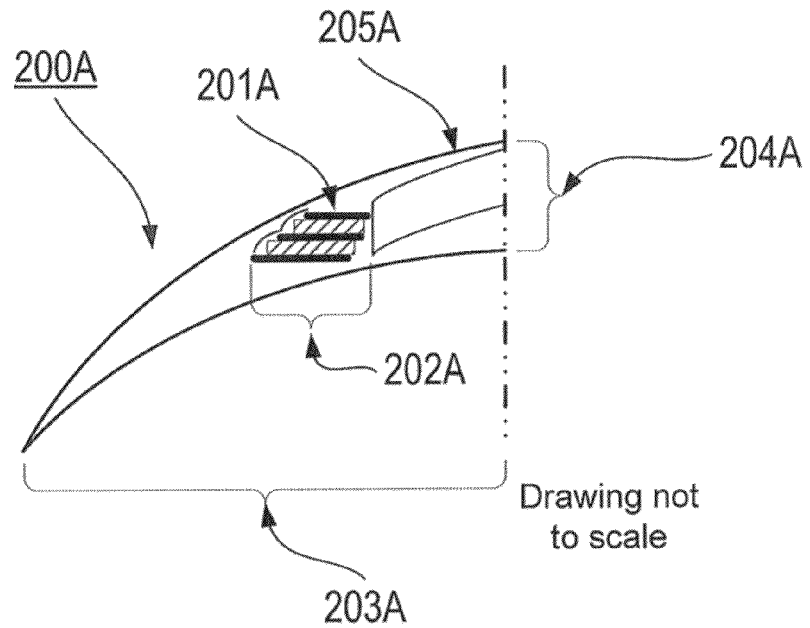
FIG. 2 illustrates two cross-sectional representations of inserts formed of stacked functional layers incorporated within two different shaped ophthalmic lenses.
Figure 2:
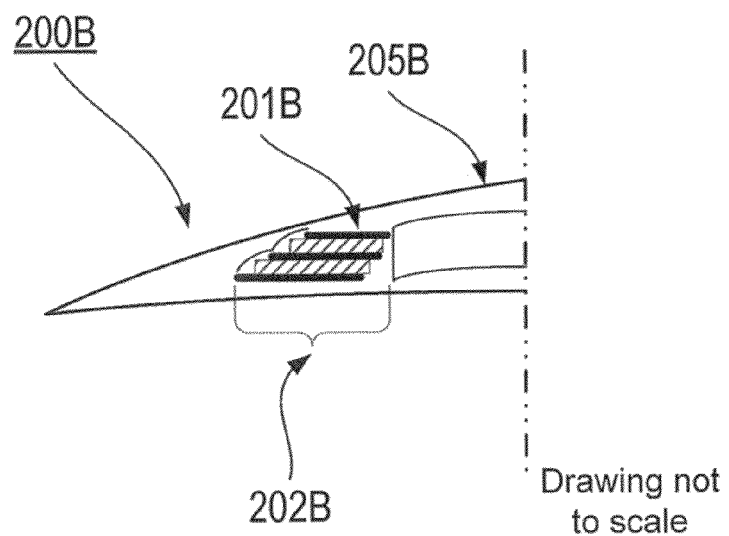
Figure 3:
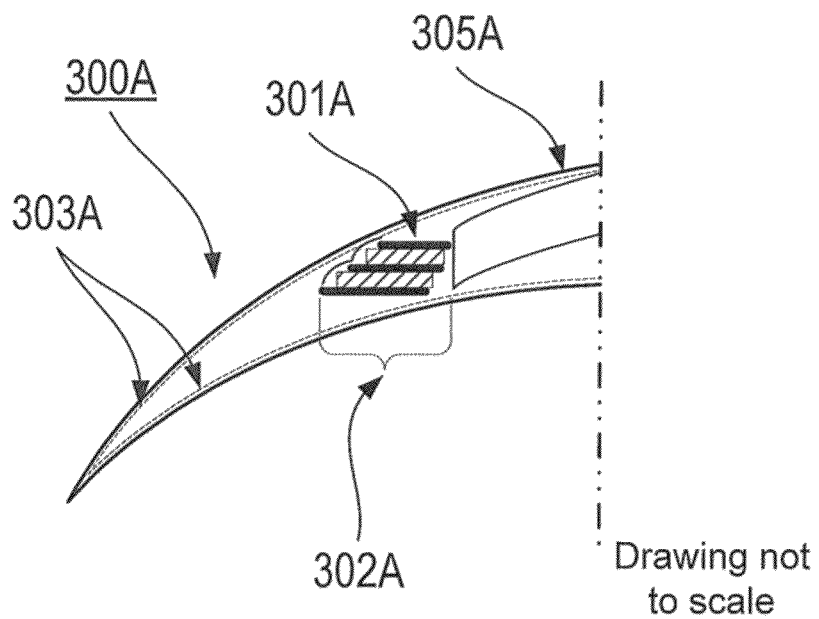
FIG. 3 illustrates two cross-sectional representations of inserts formed of stacked functional layers incorporated within ophthalmic lenses with different encapsulation parameters.
Figure 3:
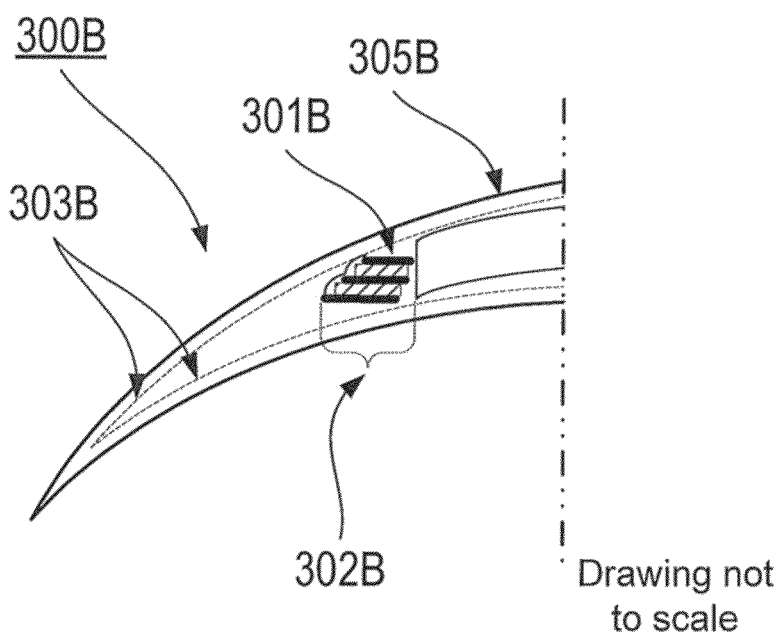
Figure 4:
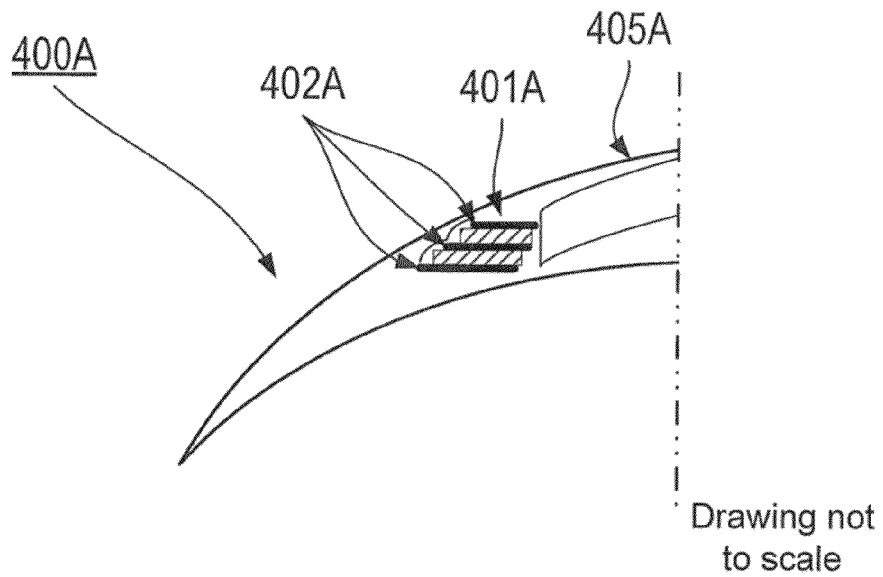
FIG. 4 illustrates two cross-sectional representations of inserts formed of stacked functional layers with different layer thicknesses incorporated within ophthalmic lenses.
Figure 4:
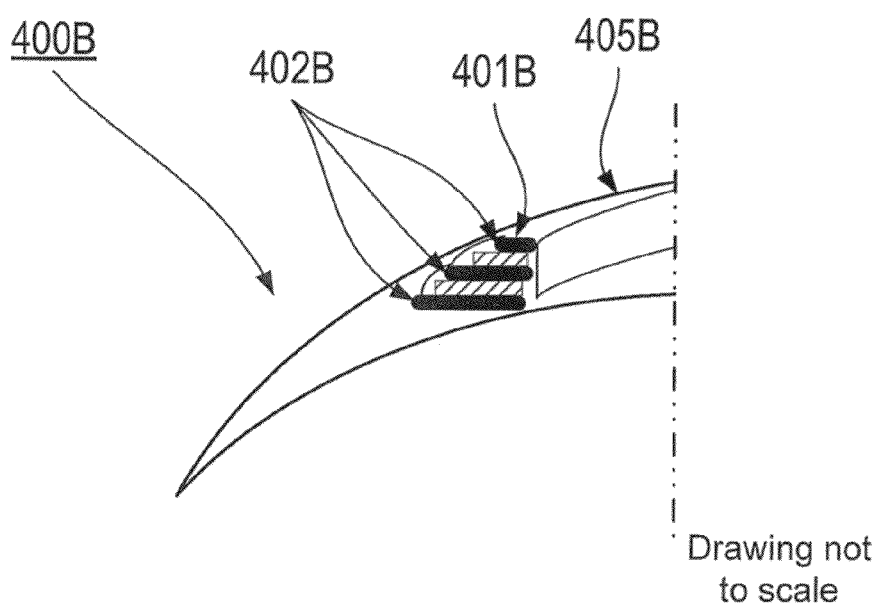

The size, shape, and stacking structure of the die that may be used to form layers such as 130, 131 and 132 in a functionalized layer insert 110 is influenced by several factors, as shown in FIGS. 2, 3 and 4.

FIG. 2 illustrates the effect of lens shape on the design of a functionalized layer insert. The base curve, diameter, and thickness of an ophthalmic lens define a maximum size and shape of an included functionalized layer insert. FIG. 2 shows, as one example, the impact of different base curves. Item 200A depicts a cross sectional view of a portion of an ophthalmic lens 205A with more curvature than the ophthalmic lens 205B, depicted in item 200B, which is flatter. The flatter lens 205B can accommodate a functionalized layer insert 201B of greater width 202B, as compared to the narrower width 202A of a functionalized layer insert 201A that fits within lens 205A having greater base curvature. It should be apparent that a lens of smaller diameter (203A indicates a lens diameter) would limit the width of a functionalized layer insert while a lens with larger diameter would accommodate a wider functionalized layer insert. Likewise, a lens of less thickness (204A indicates a lens thickness) would limit the number of layers in a functionalized layer insert as well as the width of a functionalized layer insert, while a thicker lens might support more layers and layers of greater width.

FIG. 3 illustrates the effect of encapsulation parameters on the design of a functionalized layer insert. Encapsulation parameters, such as, by way of non-limiting example, maintaining a minimum 100 micron thickness between the edge of a die and the outer edge of a lens, affect the size and shape of a functionalized layer insert and therefore the size and shape of individual layers. Item 300A depicts a cross-sectional view of a portion of an ophthalmic lens 305A with a functionalized layer insert 301A and encapsulation boundary 303A. The ophthalmic lens 305B depicted in item 300B includes a functionalized layer insert 301B and a relatively wider encapsulation boundary 303B as compared to boundary 303A which is narrower. It can be seen that the wider encapsulation boundary 303B necessitates that the functionalized layer insert 301B be narrower in width 302B as compared to the functionalized layer insert 301A with width 302A.

Depicted in FIG. 4 is the effect of functional layer thickness on the design of a functionalized layer insert. Item 400A represents a cross-sectional view of a portion of an ophthalmic lens 405A with a functionalized layer insert 401A including three layers with material, such as, for example, insulating layers, between the functional layers. A functionalized layer insert may contain more or less than three layers. The ophthalmic lens 405B depicted in item 400B includes a functionalized layer insert 401B with relatively thicker layers 402B as compared to the layers 402A in the functionalized layer insert 401A which are thinner. The lens curvature in these two examples allows the width of the bottom layers 402A and 402B to remain the same. However, it can be seen that the increased height of the functionalized layer insert 401B as compared to 401A, combined with the lens curvature, causes the top layer 402A to be limited in width. The thickness of each functional layer impacts other dimensions, such as functional layer width, that will fit within the required lens and encapsulation parameters. Thicker layers within the functionalized layer insert will be more restricted in other dimensions, such as width, in order to remain within the confines of the lens geometry.

Ring Segment Design

In the embodiments depicted in this invention, each layer within a functionalized layer insert is in the shape of a ring, either formed of an intact ring-shaped die or of multiple ring segments. Rings or ring segments are manufactured on wafers, from which they are subsequently cut. Ring segments allow significantly more efficient use of wafer material than full rings, as will be demonstrated in FIGS. 5-8. Therefore, the decision to produce an intact ring versus a ring composed of multiple ring segments may be based, in part, on the costs of the die substrate and manufacturing processes. Other factors in the decision between intact rings versus multiple ring segments include the functions to be performed on a specific layer within the functionalized layer insert and the advantage of structural stability provided when one or more intact rings are included in a functionalized layer insert. One example of a function that may require a full ring is a radio frequency antennae positioned around the full circumference of a die. Another example is an interconnect layer used to route signals between ring segments below it and ring segments above it, wherein the connections need to span different locations around the circumference of the functionalized layer insert.

Factors contributing to die cost may include, by way of non-limiting example, the cost of the substrate material and the number of steps, and therefore the time cost, associated with the fabrication process. Die created on an inexpensive substrate, such as, for example, ceramic or Kapton®, with relatively minimal fabrication steps may be produced in a less efficient layout such as full rings. Full rings result in significant waste of wafer material, but low cost material and fabrication may make production of full rings feasible for some layers within a functionalized layer insert. Alternatively, die created on an expensive substrate, such as, for example, silicon, with relatively more complex fabrication effort including many steps and details, may be architected in multiple ring segments such that the number of rings created from a single wafer is optimized. FIGS. 5-8 will show that specific ring segment designs significantly improve the nesting of rings, and therefore the ability to efficiently arrange ring segments on a wafer for optimal wafer utilization.

Other factors are considered when optimizing the layout of die, or ring segments, on wafers. For example, photo etching of die, if necessary as part of the fabrication method, is a process typically performed in rectangular blocks on a wafer. When photo etching is required, a linear layout of ring segments is more efficient than a radial layout. Dicing street width, the non-functional space between die on a wafer, affects optimization and layout. Dicing street width may be determined, for example, by the specific technology or tools used to cut the die from the wafer at the end of the manufacturing process. Edge offset is another parameter affecting die layout. Edge offset is the minimum distance between the edge of a die and the outer edge of a wafer.

When designing the layout of ring segments on a wafer, the shape of each individual ring segment significantly impacts optimization of wafer utilization. Ring segment design may be grouped into three general categories: no arc matching (FIG. 5), full arc matching (FIG. 6), and partial arc matching (FIG. 7). Different ring segment designs may be combined within one layer of a functionalized layer insert, as well as in different layers of a functionalized layer insert.

Figure 5:
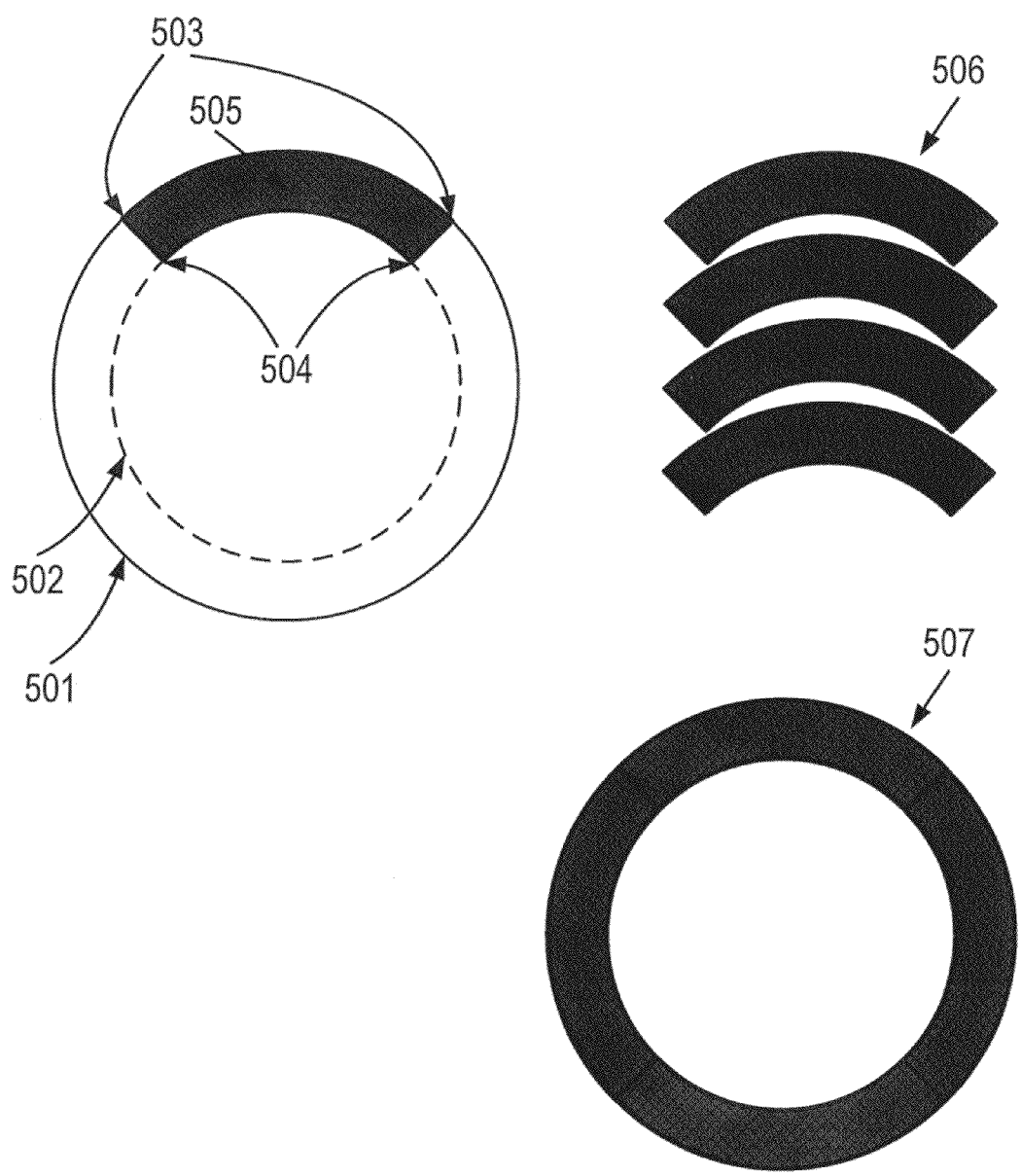
FIG. 5 illustrates a top down view of a one-quarter arc ring segment created with different inner and outer radii, as well as nesting of ring segments and a full ring composed of ring segments.

Referring now to FIG. 5, depicted is an example of ring segments designed with no arc matching, showing one-quarter ring segments created with different interior and exterior radii. The external radius defined by circle 501 is greater than the internal radius defined by circle 502, and therefore external arc 503 has less curvature than internal arc 504. Ring segment 505 therefore has different internal and external radii. Item 506 demonstrates that ring segments 505 do not nest efficiently, with significant gaps between the individual die, which results in waste when producing die on a wafer. Item 507 reveals that four ring segments 505 may be combined to produce a full ring with a circular interior edge.

Figure 6:
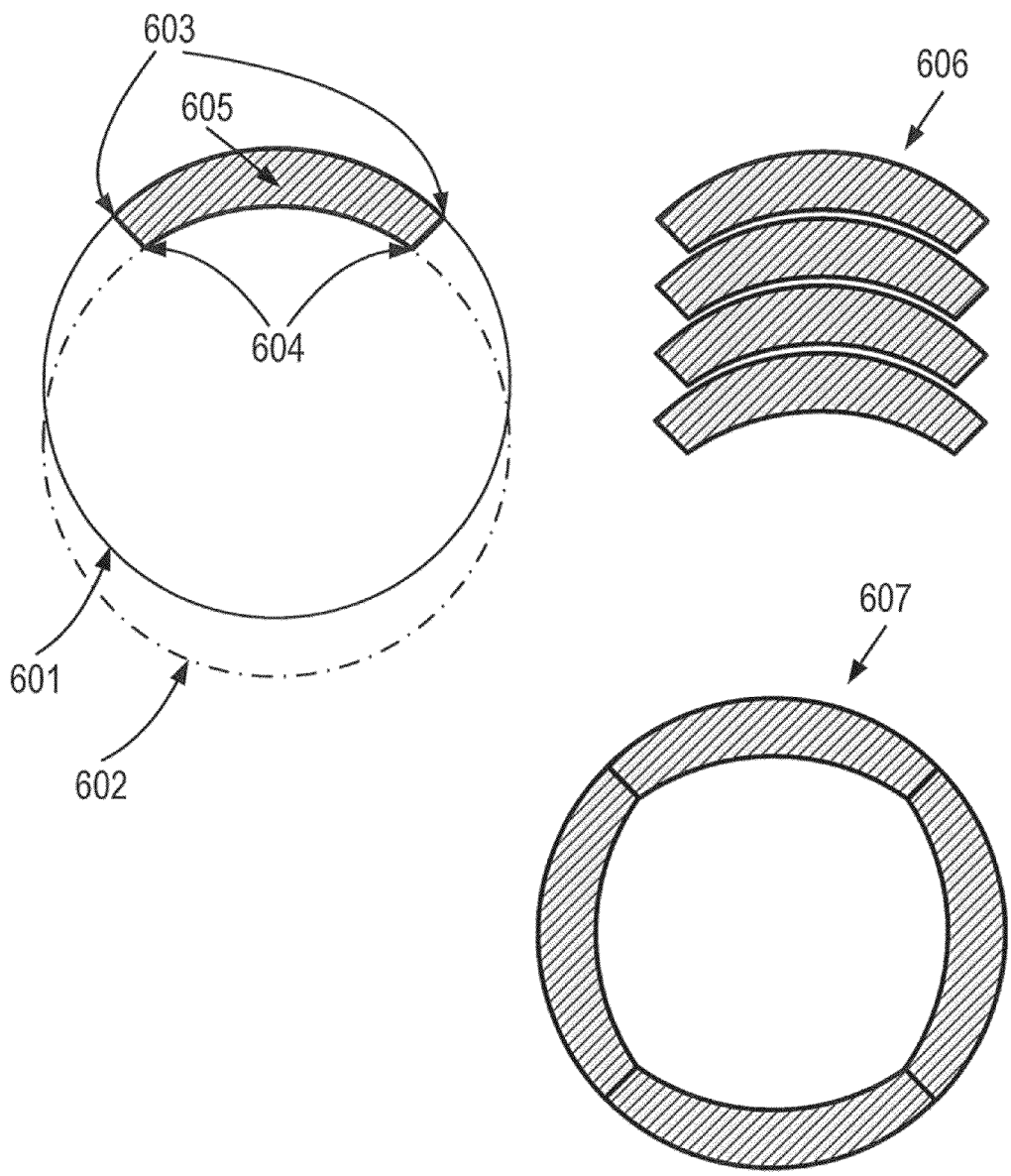
FIG. 6 illustrates a top down view of a one-quarter arc ring segment created with matching inner and outer radii, as well as nesting of ring segments and a full ring composed of ring segments.
Figure 7:
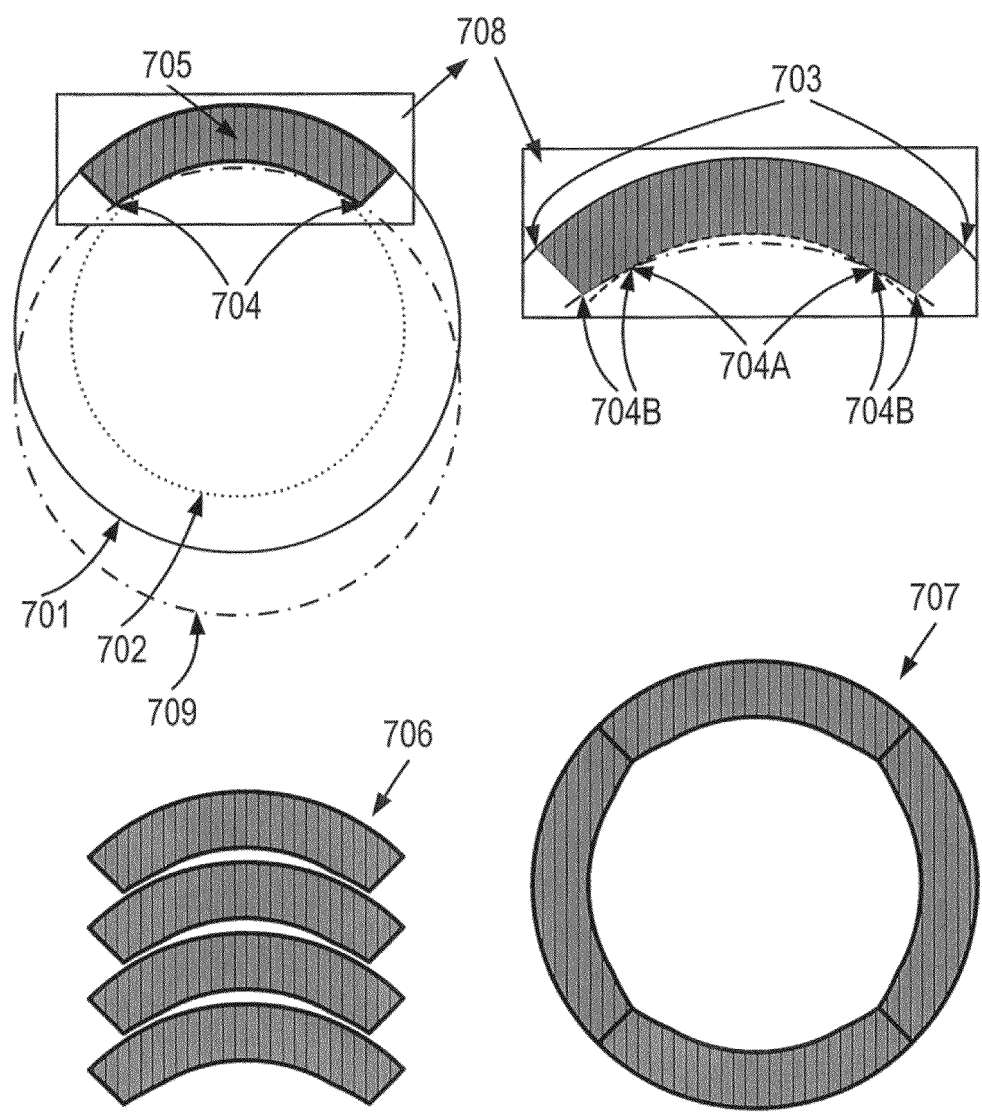
FIG. 7 illustrates a top down view of a one-quarter arc ring segment created with partial matching of inner and outer radii, as well as nesting of ring segments and a full ring composed of ring segments.

Referring now to FIG. 6, an example of full arc matching is shown including one-quarter ring segments created with identical interior and exterior radii. The external radius defined by circle 601 is identical to the internal radius defined by circle 602, which is offset rather than reduced in size to define the shape of ring segment 605. Therefore external arc 603 and internal arc 604 have identical curvature. It is shown in item 606 that ring segments 605 can be precisely nested, leaving only a small dicing street width required for cutting the individual die 605 from the wafer. This design significantly minimizes waste when producing die on a wafer. A full ring composed of four ring segments 605 is depicted in item 607. Since the full arc matching design results in die 605 that are slightly tapered on the ends, the interior edge of the resulting ring in item 607 is not perfectly circular.

Referring now to FIG. 7, a partial arc matching design is depicted with one-quarter ring segments created with a combination of three curvatures. Item 708 provides a close up view of the elements defining the shape of ring segment 705. In item 708, the outline has been removed from ring segment 705 so that the defining shapes may be more clearly seen. The curvature of external arc 703 is determined by the radius of circle 701. Internal arc 704 is comprised of two different curvatures. Circle 702, denoted with a dashed line, has a smaller radius than circle 701 and defines the center portion 704A of the internal arc 704. Circle 709, denoted with an alternating dash-dot line, has a radius identical to circle 701. Circle 709 is positioned such that it intersects circle 702 towards the ends of ring segment 705. Circle 709 therefore defines the curvature of the two end portions 704B of the internal arc 704. This hybrid design for internal arc 704 maximizes the active area available on the die while including partial arc matching near the ends of ring segment 705 to improve nesting and therefore efficiency of die layout on a wafer. Item 706 shows the nesting of ring segments 705, wherein the identical radii of circles 701 and 709 in the design of ring segments 705 provide for close nesting alignment at the ends of the die. Item 707 shows a full ring composed of four ring segments 705. The design of die 705 includes tapered ends, resulting in a ring with an interior edge which is not perfectly circular, shown in item 707.

Figure 8:
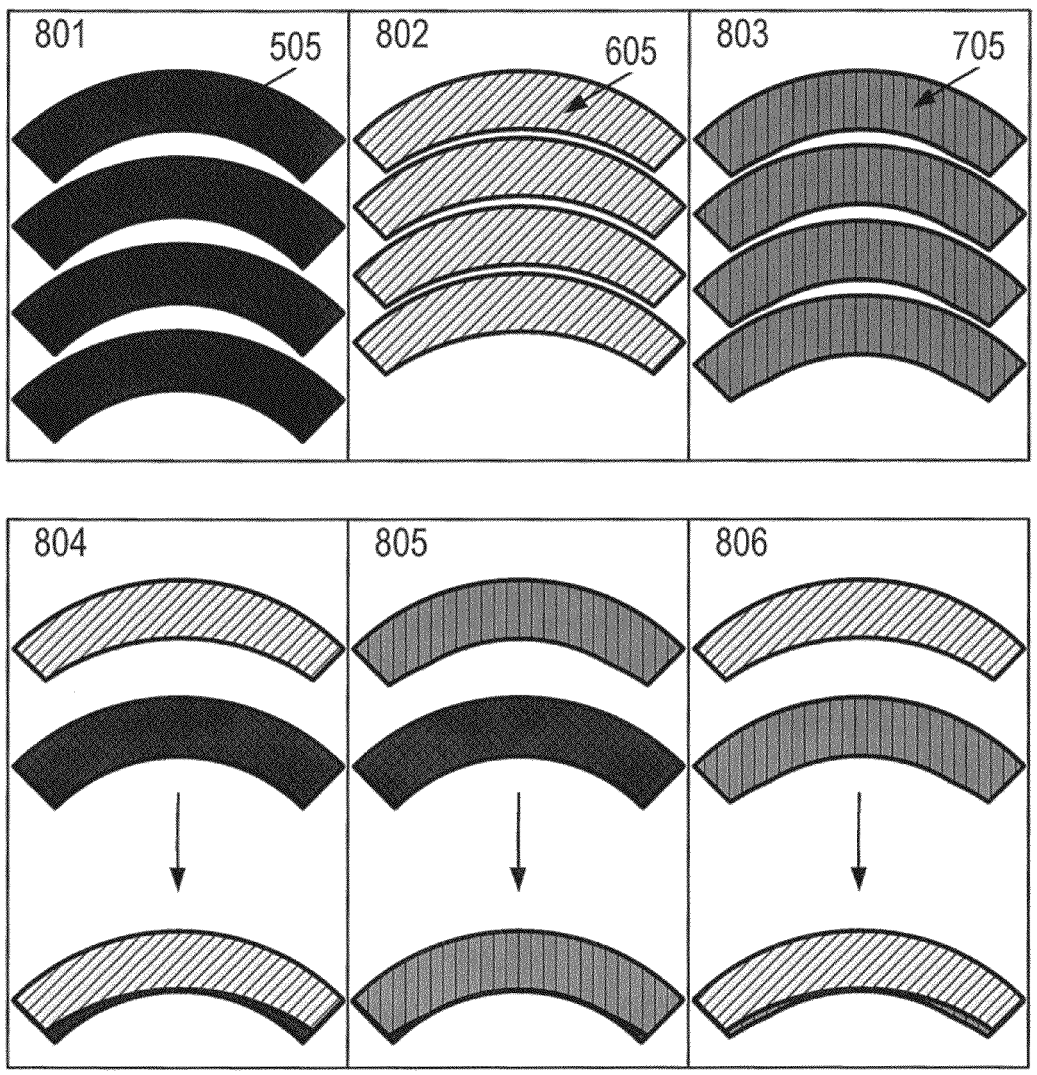
FIG. 8 illustrates a top down view of various ring segment shapes from FIGS. 5-7 for comparison purposes.

Referring now to FIG. 8, a comparison of the ring segments described in FIGS. 5-7 is shown. Item 801 shows the nesting of ring segments 505 created with no arc matching. Item 802, likewise depicts nesting of full arc-matched ring segments 605, and item 803, partial arc-matched ring segments 705. Item 802 clearly shows optimal nesting of full arc-matched ring segments 605. It is also evident from item 803 that partial arc-matched ring segments 705 nest more efficiently than ring segments 505 with no arc matching.

Item 804 compares the area of fully arc-matched ring segment 605 with ring segment 505, designed with no arc matching. When 605 is overlaid upon 505, it can be seen that 605 has tapered ends, reducing the surface area available on the fully arc-matched die 605. Although full arc matching supports the most efficient layout of ring segments on a wafer, it does so at the cost of less surface area on each ring segment.

Item 805 similarly compares the area of partially arc-matched ring segment 705 with ring segment 505, designed with no arc matching. When 705 is overlaid upon 505, it is again evident that 705 has tapered ends, but less than seen in the comparison of item 804. The surface area available on the partially arc-matched ring segment 705 is somewhat reduced as compared to ring segment 505 with no arc matching.

Finally, item 806 compares fully arc-matched ring segment 605 with partially arc-matched ring segment 705. Although both have tapered ends, when 605 is overlaid upon 705 it is shown that partially arc-matched ring segment 705 has a slightly greater surface area. Partial arc matching is a hybrid solution which preserves more surface area on a ring segment while adjusting the curvature near the ends of the ring segment for improved nesting in the layout of ring segments on a wafer. Partial arc matching may be used, by way of non-limiting example, to create battery die where the active area for the battery is not sacrificed but the ring segment ends are slightly narrowed, improving manufacturing efficiency without impacting functionality.

Conclusion

The present invention, as described above and as further defined by the claims below, provides various designs for rings and ring segments that make up the functionalized layers in a functional layer insert, for incorporation into an ophthalmic lens.

The invention claimed is:

1. An active lens insert for an ophthalmic lens comprising:
   arcuate shape ring segments assembled into substrate layers with one or both of electrical and logical functionality, wherein the substrate layers are stacked, wherein a size and a stacking structure for the substrate layers is based on a thickness around an optical zone of the ophthalmic lens; and
   electrical interconnections between substrate layers,
   wherein the active lens insert is encapsulated with one or more materials that may be bonded within a body of a molded ophthalmic lens, and
   wherein one or more of the arcuate shape ring segments have one or both tapered ends.

2. The active lens insert of claim 1, wherein the substrate layers are adhered to insulating layers.

3. The active lens insert of claim 1, wherein the arcuate shape ring segments are cut from a wafer.

4. The active lens insert of claim 1, wherein the arcuate shape ring segments comprise arc matched sections.

5. The active lens insert of claim 1, wherein two or more of the arcuate shape ring segments can form a full ring.

6. The active lens insert of claim 3, wherein a design of each of the arcuate shape ring segments is based on factors comprising wafer optimization.

7. The active lens insert of claim 6, wherein the design of each of the arcuate shape ring segments is further based on surface area maximization of the arcuate shape ring segments within the active lens insert.

8. The active lens insert of claim 1, wherein the arcuate shape ring segments are non-arc matched segments.

9. The active lens insert of claim 1, wherein the arcuate shape ring segments comprise both arc matched segments and non-arc matched segments.

10. The active lens insert of claim 1, wherein the substrate layers include both said assembled ring substrate layers from the arcuate shape ring segments and intact full rings.

11. The active lens insert of claim 10, wherein an intact full ring comprises a metallic layer which functions as an antenna.

12. The active lens insert of claim 1, wherein the size and stacking structure of the substrate layers is further based on a base curve of the ophthalmic lens.

13. The active lens insert of claim 1, wherein the size and stacking structure of the substrate layers is further influenced by a diameter of the ophthalmic lens.

14. The active lens insert of claim 1, wherein the size and stacking structure of the substrate layers is further influenced by encapsulation parameters of the active lens insert.

15. The active lens insert of claim 1, wherein the substrate layers comprise silicon based wafer layers.

16. The active lens insert of claim 1, wherein the substrate layers comprise ceramic based wafer layers.

17. The active lens insert of claim 1, wherein the substrate layers comprise Kapton® based wafer layers.

18. The active lens insert of claim 1, wherein the substrate layers comprise polymide film based wafer layers.

19. The active lens insert of claim 1, wherein the thickness around the optical zone of the ophthalmic lens is a predetermined thickness.

20. An active lens insert for an ophthalmic lens comprising:
arcuate shape ring segments assembled into substrate layers with one or both of electrical and logical functionality, wherein the substrate layers are stacked, wherein a size and a stacking structure for the substrate layers is based on a thickness around an optical zone of the ophthalmic lens; and
electrical interconnections between substrate layers,
wherein the active lens insert is encapsulated with one or more materials that may be bonded within a body of a molded ophthalmic lens,
wherein the arcuate shape ring segments are cut from a wafer,
wherein a design of each of the arcuate shape ring segments is based on factors comprising wafer optimization, and
wherein the design of each of the arcuate shape ring segments is further based on surface area maximization of the arcuate shape ring segments within the active lens insert.

21. An active lens insert for an ophthalmic lens comprising:
arcuate shape ring segments assembled into substrate layers with one or both of electrical and logical functionality, wherein the substrate layers are stacked, wherein a size and a stacking structure for the substrate layers is based on a thickness around an optical zone of the ophthalmic lens; and
electrical interconnections between substrate layers,
wherein the active lens insert is encapsulated with one or more materials that may be bonded within a body of a molded ophthalmic lens, and
wherein the arcuate shape ring segments are non-arc matched segments.

22. An active lens insert for an ophthalmic lens comprising:
arcuate shape ring segments assembled into substrate layers with one or both of electrical and logical functionality, wherein the substrate layers are stacked, wherein a size and a stacking structure for the substrate layers is based on a thickness around an optical zone of the ophthalmic lens; and
electrical interconnections between substrate layers,
wherein the active lens insert is encapsulated with one or more materials that may be bonded within a body of a molded ophthalmic lens, and
wherein the arcuate shape ring segments comprise both arc matched segments and non-arc matched segments.

23. An active lens insert for an ophthalmic lens comprising:
arcuate shape ring segments assembled into substrate layers with one or both of electrical and logical functionality, wherein the substrate layers are stacked, wherein a size and a stacking structure for the substrate layers is based on a thickness around an optical zone of the ophthalmic lens; and
electrical interconnections between substrate layers,
wherein the active lens insert is encapsulated with one or more materials that may be bonded within a body of a molded ophthalmic lens, and
wherein the substrate layers comprise Kapton® based wafer layers.

* * * * *